No. 849,084. PATENTED APR. 2, 1907.
A. F. PRIEST.
AUTOMATIC VALVE.
APPLICATION FILED APR. 28, 1906.
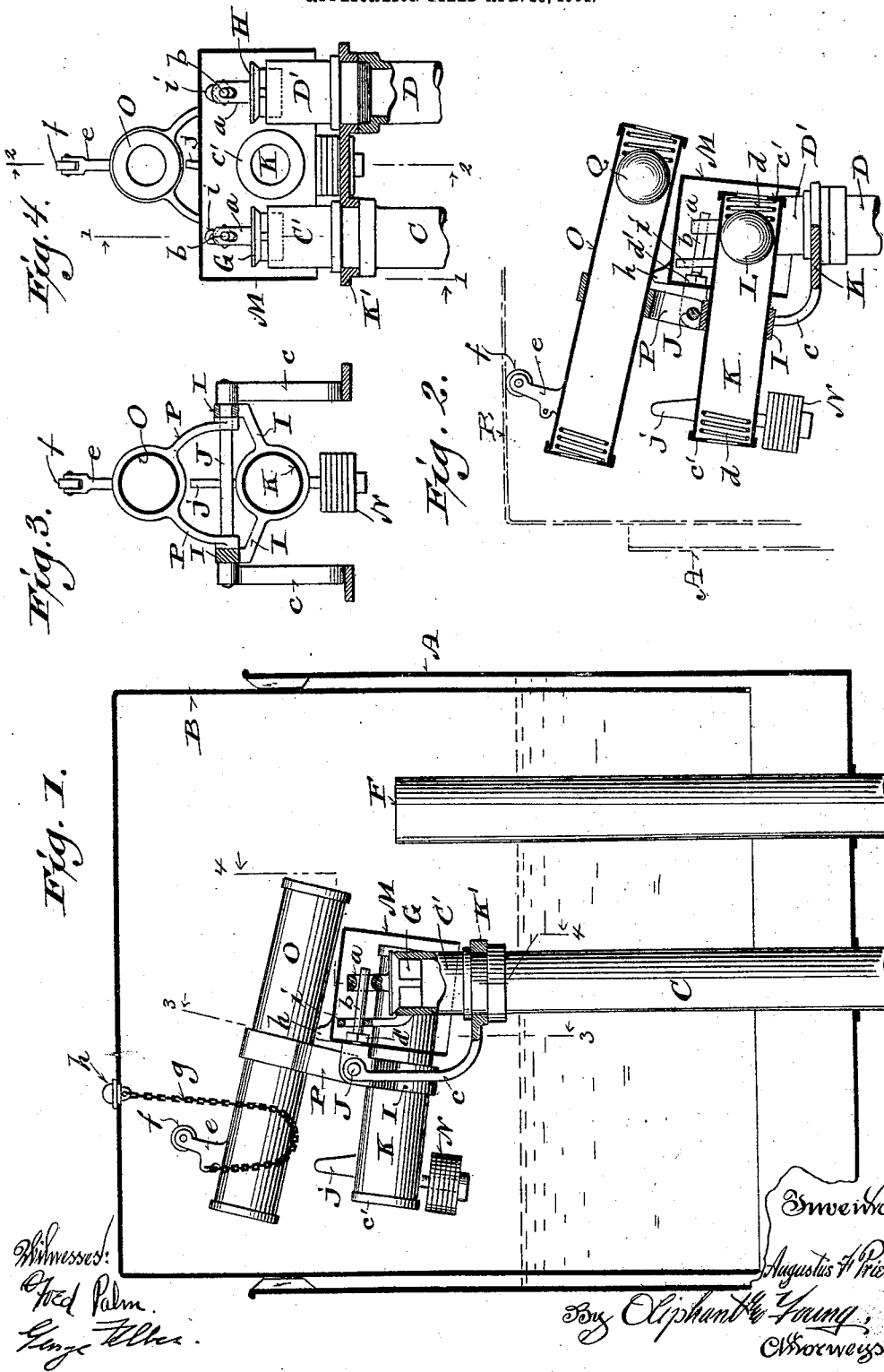

UNITED STATES PATENT OFFICE.

AUGUSTUS F. PRIEST, OF MILWAUKEE, WISCONSIN, ASSIGNOR TO THE A. F. PRIEST MFG. CO.

AUTOMATIC VALVE.

No. 849,084.　　　Specification of Letters Patent.　　　Patented April 2, 1907.

Application filed April 28, 1906. Serial No. 314,145.

*To all whom it may concern:*

Be it known that I, AUGUSTUS F. PRIEST, a citizen of the United States, and a resident of Milwaukee, in the county of Milwaukee and State of Wisconsin, have invented certain new and useful Improvements in Automatic Valves; and I do hereby declare that the following is a full, clear, and exact description thereof.

The particular object of my invention is to provide a simple and effective automatic valve for gas-mixers to be operated in conjunction with domestic gas-machines, its construction being such that with the least possible power said valve is tripped to admit or cut off the gas and air to the mixer-tank in proportion to supply of gas consumed in the system, the mechanism being so sensitive as to entirely eliminate any possible flare or variation of pressure as the valve is operated.

Said invention consists in certain peculiarities of construction and combination of parts, as hereinafter fully set forth with reference to the accompanying drawings and subsequently claimed.

In the drawings, Figure 1 represents a vertical sectional view of a gas-mixing apparatus made in accordance with my invention, the valve mechanism being partly in section, as indicated by line 1 1 in Fig. 4; Fig. 2, a detail section of the valve mechanism, as indicated by line 2 2 of Fig. 4; Fig. 3, a cross-section of the same, as indicated on line 3 3 of Fig. 1; and Fig. 4, another cross-section of said valve mechanism, as indicated by line 4 4 of Fig. 1.

Referring by letter to the drawings, A indicates a tank provided with a telescopic water-sealed cover B. The tank has the usual air and gas inlet pipes C D, respectively, and also a supply-pipe F leading therefrom, these pipes all terminating above the water seal, as shown. The nozzle ends C' D' of the air and gas pipes C D are controlled by check-valves G H, respectively, each valve being provided with a slotted shank $a$, into which is fitted a stem $b$ of a saddle I, which saddle is pivotally mounted upon a rod J, that is secured in arms $c$ of a bracket K, mounted on the pipe-nozzles. The said bracket is secured between shoulders of the pipe-nozzles and the ends of the pipes C D, into which said nozzles are threaded.

The saddle I carries a short tubular lever K, which extends equally in either direction from the rod J, and loosely fitted in the tube is a gravity-actuated ball L, which ball is adapted to travel from end to end of said tube, it being confined therein by caps $c'$ and cushioned by springs $d$ at the ends of its strike.

An inverted mixing-box M is secured to the stems $b$ of the saddle by nuts $d'$, the box serving as a housing over the nozzles of the air and gas pipes, and insures a perfect mixture of air and gas previous to its escape into the tank.

By the foregoing description it will be seen that the pivoted tubular lever has a preponderance of weight upon one side of its fulcrum owing to its connection with the valves and box M. This weight is counterbalanced by plates N, suspended from the tube K at its end opposite the valves, so that the weight of ball L in said tube will act to open said valves when the aforesaid tube is tilted in the opposite direction from that shown in the drawings. A supplementary balanced tubular lever O is also pivoted upon the rod J by depending legs P, this tube being similar in every respect to tube K, having a loose ball Q therein, together with spring-cushions and caps, but of a greater length, so that when its ball is at either end the difference in leverage or lifting power is proportionately greater than that of the first-named tube. The tube O is provided with a finger $e$, in which is mounted an antifriction-roller $f$, and secured to the finger is a chain $g$, that connects with a plug $h$ in the top of the tank-cover B, said chain being for the purpose of operating the supplementary tube O, which closes the valve when said tank-cover has accumulated its full capacity of gas.

In Figs. 1 and 2 of the drawings the apparatus is shown, for example, partly filled with gas, with the cover B settling as the gas is consumed and the valves closed. In this position the weight of both balls is at the ends of the tubes on the valve side of their fulcrum and has previously permitted said valves to close by gravity, the stems $b$ being limited in their movement in either direction by slotted stops $i$ extending upward from the nozzles. Should the tank-cover continue to settle, the bottom will engage and depress the roller $f$ of the top tube until the equilibrium of said tube has reversed. This will cause its ball to roll to the opposite end of said tube, causing the latter to drop suddenly and strike a fin $j$ of tube K, which action, owing to the increased leverage-power of tube O, will depress this end of said tube K until its ball by gravity also travels to the depressed end of its tube, the valves in the meantime having been opened to admit a fresh charge of air and gas. The valves being open will now remain in this position until the tank-cover rises and through its chain connection again closes them, when the parts will assume the position shown in Figs. 1 and 2 of the drawings, with the supplementary tube resting upon a fin $k$ on the top of the mixing-box and the stems $b$ of the saddle contacting with the bottoms of the slotted stops $i$, thereby removing all pressure of the valve mechanism from the valves.

I claim—

1. A valve mechanism comprising a balanced valve-lever, a weight arranged to travel across the lever-fulcrum, a supplementary balanced lever in connection with the first-named lever, said supplementary lever being provided with a weight arranged to travel across its fulcrum and having greater power than the said first-named lever, whereby the first-named lever is actuated.

2. In a gas-mixing apparatus, a tank provided with a telescopic cover, air, gas and supply pipes for the tank, valves for air and gas pipes, a balanced lever in connection with the valves, a weight arranged to travel across the lever-fulcrum, a supplementary balanced lever in connection with the first-named lever, said supplementary lever being provided with a weight arranged to travel across its fulcrum, and having greater power than said first-named lever, and means in connection with the last-named lever and telescopic cover whereby an initial movement is imparted to said lever to control the movements of the first-named lever.

3. In a gas-mixing apparatus, a tank provided with a telescopic cover, air, gas and supply pipes for the tank, valves for the air and gas pipes, a balanced lever in connection with the valves, a movable weight carried by the lever, a supplementary balanced lever in connection with the first-named lever, a movable weight carried thereby, said lever and weight having greater power than the first-named lever, and means in connection with the last-named lever and telescopic cover, whereby an initial movement is imparted to said lever to change the position of its weight and thereby actuate the first-named lever.

4. In a gas-mixing apparatus, a tank having a telescopic cover, air, gas and supply pipes for the tank, valves for the air and gas pipes, a balanced pivoted tubular lever in connection with the valves, a ball-weight loosely fitted in the tubular lever, a supplementary balanced pivoted tubular lever of greater length than the first-named lever and in connection therewith, a ball-weight loosely fitted therein, and means in connection with the last-named tubular lever and telescopic cover, whereby an initial movement is imparted to said lever to change the position of its weight, and thereby actuate the first-named lever.

In testimony that I claim the foregoing I have hereunto set my hand, at Milwaukee, in the county of Milwaukee and State of Wisconsin, in the presence of two witnesses.

AUGUSTUS F. PRIEST.

Witnesses:
GEO. W. YOUNG,
FRED PALM